US007935428B2

(12) United States Patent
Doye et al.

(10) Patent No.: US 7,935,428 B2
(45) Date of Patent: May 3, 2011

(54) COMPONENT WITH A COATING FOR REDUCING THE WETTABILITY OF THE SURFACE AND METHOD FOR PRODUCTION THEREOF

(75) Inventors: Christian Doye, Berlin (DE); Ursus Krüger, Berlin (DE); Manuela Schneider, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 258 days.

(21) Appl. No.: 11/883,729

(22) PCT Filed: Jan. 31, 2006

(86) PCT No.: PCT/EP2006/050543

§ 371 (c)(1),
(2), (4) Date: Aug. 2, 2007

(87) PCT Pub. No.: WO2006/082180

PCT Pub. Date: Aug. 10, 2006

(65) Prior Publication Data

US 2008/0118772 A1 May 22, 2008

(30) Foreign Application Priority Data

Feb. 4, 2005 (DE) ........................ 10 2005 006 014

(51) Int. Cl.
*B32B 15/04* (2006.01)
*B32B 15/00* (2006.01)

(52) U.S. Cl. ............ 428/469; 106/2; 428/142; 428/144; 428/148; 428/409; 428/410; 428/612; 428/687; 428/632

(58) Field of Classification Search ........................ None
See application file for complete search history.

(56) References Cited

U.S. PATENT DOCUMENTS

| | | | | |
|---|---|---|---|---|
| 5,320,908 | A * | 6/1994 | Sodervall et al. | 428/461 |
| 5,817,422 | A * | 10/1998 | Engelhaupt | 428/457 |
| 5,853,897 | A * | 12/1998 | Engelhaupt | 428/457 |
| 6,071,398 | A | 6/2000 | Martin et al. | |
| 7,074,498 | B2 * | 7/2006 | Tavkhelidze et al. | 428/687 |
| 2001/0037876 | A1 * | 11/2001 | Oost et al. | 165/133 |
| 2006/0246297 | A1 * | 11/2006 | Sakoske et al. | 428/426 |
| 2007/0237945 | A1 * | 10/2007 | Ohrlander et al. | 428/328 |
| 2007/0237946 | A1 * | 10/2007 | Ohrlander et al. | 428/328 |
| 2009/0123733 | A1 * | 5/2009 | Ohrlander et al. | 428/328 |

FOREIGN PATENT DOCUMENTS

CN 1226918 A 8/1999

(Continued)

OTHER PUBLICATIONS

J C Moore et al., "Fabrication of cube-textured Ag-buffered Ni substrates by electroepitaxial deposition", Supercond. Sci. Technol. 14, 2001, pp. 124-129, (2001).

*Primary Examiner* — Aaron Austin

(57) ABSTRACT

The invention relates to a component made from a substrate with a coating, whereby that coating forms a surface of the component with reduced wettability. The invention further relates to production of said component. The coating which forms a surface with projections and recesses, brings about a reduction in wettability, in particular, by means of an effect based on the properties of lotus blossom. According to the invention, a metal with antimicrobial properties, in particular silver is provided under the coating, which is not fully covered, in other words, regions remain free of the coating in which the surface of the component is formed by the antimicrobial properties.

6 Claims, 2 Drawing Sheets

FOREIGN PATENT DOCUMENTS

| | | | |
|---|---|---|---|
| DE | 100 15 855 | A1 | 10/2001 |
| EP | 0564503 | B1 | 10/1993 |
| EP | 0 903 389 | A1 | 3/1999 |
| EP | 1 138 362 | A2 | 10/2001 |
| WO | WO 03/013748 | A1 | 2/2003 |
| WO | WO 2004045577 | A1 * | 6/2004 |

* cited by examiner

COMPONENT WITH A COATING FOR REDUCING THE WETTABILITY OF THE SURFACE AND METHOD FOR PRODUCTION THEREOF

CROSS REFERENCE TO RELATED APPLICATIONS

This application is the US National Stage of International Application No. PCT/EP2006/050543, filed Jan. 31, 2006 and claims the benefit thereof. The International Application claims the benefits of German application No. 10 2005 006 014.5 filed Feb. 4, 2005, both of the applications are incorporated by reference herein in their entirety.

FIELD OF INVENTION

The invention relates to a component, featuring a substrate with a coating which, by comparison with an uncoated substrate, features a surface with a low wettability.

BACKGROUND OF THE INVENTION

Surfaces with low wettability, as specified above, are typically used as so called lotus effect surfaces and are described for example in DE 100 15 855 A1. In accordance with this publication the outstanding feature of this type of surface is its microstructure which can be obtained by a layer deposition made up of solutions but also through electrolytic deposition. This mimics the effect observed on the leaves of the lotus plant according to which a microstructuring of the surface, which for this purpose must have projections and recesses with a radius of 5 to 100 μm, reduces the wettability for water as well as contamination particles. This enables contamination of the corresponding surface to be counteracted.

SUMMARY OF INVENTION

This object of the invention consists of making available a component with a coating for reducing the wettability of the surface of the component which, as well as a lower wettability of the surface, also guarantees a comparatively good resistance against contamination by microorganisms.

This object is inventively achieved with the component specified above by a metal with anti-microbial characteristics which is not fully covered by the coating being located underneath the coating. Silver in particular, which has a known anti-microbial effect, can be used as a metal with anti-microbial characteristics (referred to for short as metal below). Palladium or platinum however are also considered as alternative metals.

The invention makes use of the knowledge that the anti-microbial characteristics, i.e. the characteristics of preventing an accumulation or buildup of microrganisms or viruses on the surface of the component, also comes into play if the metal does not form an enclosed surface of the component, but is partly covered by the coating for reducing the wettability. A component with such a layer structure can thus advantageously simultaneously ensure low wettability of the surface and have an anti-microbial effect. In particular the characteristics of low wettability of the surface over a longer period are guaranteed by this since contamination of the surface by microorganisms and such like is prevented. A prerequisite for this is the anti-microbial effect of the surface of the component. Microorganisms can namely form a film-like layer on components which is very stable and would lower or even remove the surface characteristics of a coating reducing wettability.

In accordance with a particular embodiment of the invention there is provision for the metal to form an intermediate layer between the substrate and the coating. This enables the metal to be applied as a thin coating, so that for the anti-microbial effect it is not necessary for the entire component to consist of the metal. Instead any metal can be chosen as the material, with the coating being applied for example electrochemically or by vapor deposition on the substrate of the component. This means that advantageously a small amount of metal is consumed in the production of the anti-microbial characteristics of the component, which leads to cost effective solutions.

In accordance with a further embodiment of the invention the metal with the anti-microbial effect consists of a biaxial textured epitactic layer. These layers can preferably be formed by coating onto a substrate which is also biaxially textured, with this textured structure transferring during the coating onto the layer from the metal (cf. for example J. C. Moore et al., Fabrication of cube-textured Ag-buffered Ni substrates by electroepitaxial deposition, Supercond. Sci. Technol. 14, 124-129, (2001)). This enables the characteristics of the metal layer to be advantageously influenced. For example the biaxial textured, epitactic metal layer offers greater resistance against a corrosion attack. Thus in the circuit voltage class of metals such a layer made of silver for example has an increased standard potential by comparison with the literature values of silver in relation to hydrogen (abbreviated to standard potential below). The anti-microbial characteristics of the metal layer can also be simultaneously influenced since this anti-microbial effect is caused as a result of not yet definitively explained electrochemical processes on the layer.

A developed embodiment of the invention provides for the coating on the metal to also be metallic and to form a biaxial textured, epitactic layer on the layer of the metal with the anti-microbial effect. The coating is preferably made of copper. However other metals such as iron for example can also be used. The biaxial textured, epitactic production of the coating can also advantageously be used explicitly to change the electrochemical characteristics of the coating. For the case in which the coating is metallic, the area of application in which the component is to be used should be taken into account during production. The anti-microbial, partly exposed metal layer and the metallic coating namely form local elements, which can make it easier for corrosion to attack the component. To prevent this the standard potentials of the coating and the metal layer lying below them must not be too far apart. Simultaneously the electrochemical processes occurring between the coating of the anti-microbial metal layer are an influencing factor to be taken into account for the anti-microbial effect of the metal layer.

The selection of the metals for the coating and the anti-microbial metal layer lying below them thus depends on the application and must be determined by corresponding trials for example. In this case the selection of suitable metals as well as the option of embodying the coating or the layer lying below as a biaxial textured epitactic layer is available to the person skilled in the art as an influencing parameter.

The effect reducing the wettability of the surface of the component can advantageously be improved if the surface of the coating has a microstructure which promotes the lotus effect. In this case the microstructure with its projections and recesses, as already mentioned above, is embodied such that the effect of leaves of the lotus plant is mimicked. Methods of production for such a microstructure on the surface are described in patent DE 100 15 855 A1 mentioned above.

In accordance with an especially advantageous method the microstructure can be produced by pulse plating. In this case, in accordance with a particular embodiment of the invention, a component is obtained in which the microstructure is overlaid on a nanostructure created by pulse plating. This nanostructure advantageously also forms finer projections and recesses (for example nanoneedles) which further reduce a wettability of the surface of the component.

A further improvement for the component is produced if the structure elements of the nanostructure (for example the nanoneedles) consist of a metal oxide. This provides a further option for influencing the electrochemical characteristics of the structure elements of the nanostructure, since the metal oxides (for example copper oxide) generally have a higher standard potential. In this case for example a coating of copper can essentially be converted into copper oxide, with the standard electrode potential approaching that of the anti-microbial, partly exposed layer.

The invention further relates to a method for creating a coating on a component which, by comparison with an uncoated substrate, has a surface with a low wettability.

Such a method is described in patent DE 100 15 855 A1 already mentioned above. For example the coating (lotus effect surface) can be applied by a layer deposition method from solutions.

Consequently a further object of the invention is to specify a method for creating a coating on a component with a wettability-reducing surface which guarantees a comparatively long-lasting effect in respect of reduced wettability.

In accordance with the invention this object is achieved by said method in that the coating is produced on a metal with anti-microbial characteristics, especially on silver, such that the metal is not fully covered by the coating, with the surface being produced by electrochemical pulse plating with a microstructure of the surface which reduces the wettability. It has namely been shown that an irregular layer growth is supported by pulse plating, so that a microstructure can form which reduces wettability by forming projections and recesses in the micrometer range. The method in accordance with the invention is thus advantageously suited for creating, solely by electrochemical methods a difficult-to-wet surface on a component and simultaneously for example through an incomplete layer of the metal with anti-microbial characteristics, for providing a surface on which it is difficult for microrganisms and viruses to accumulate.

In accordance with a particular embodiment of the invention there is provision for the pulse plating to be undertaken as reverse pulse plating such that along with the microstructure, a nanostructure overlaying this structure is created, further reducing wettability. The pulse length in the method step for producing the nanostructure is advantageously less than 500 ms. Favorable deposition parameters can thus be set in this method step on the surface to be created so that the nanostructure created differs sufficiently in its dimensions from the microstructure created. The interaction between microstructure and the nanostructure overlaid onto the microstructure leads to a sharp reduction of wettability of the surface of the electrochemically created coating.

With reverse pulse plating the current pulses are created by reversing the polarity of the deposition current in each case so that advantageously a sharp timing decrease in the charge displacements on the surface can be achieved. Advantageously the individual current pulses lie in the range between 10 and 250 ms as regards their length. It has been shown that with the said parameters the nanostructure of the surface is advantageously especially strongly marked In this case the cathodic pulse can be at least three times as long as the anodic pulse. Those pulses for which the result is a deposition on the surface are recorded as cathodic pulses whereas the anodic pulses bring about a dissolving of the surface. For the specified relationship between cathodic and anodic pulses it has been shown at that the needle-type basic elements of the nanostructure are advantageously created with a high density on the microstructure which promotes the lotus effect to be achieved. There is also the option with reverse pulse plating of executing the cathodic pulse with a higher current density than the anodic pulse. The deposition rate of the cathodic pulse compared to the removal rate of the anodic pulse is also increased by this measure. The pulse length for creating a microstructure in an upstream method step can amount to at least one second. With the pulse lengths in the seconds range the required microstructure of the surface can be produced with favorable timing of using electrochemical methods. A microstructure forms simultaneously with the nanostructure of the surface if the said method parameters for creating the nanostructure of the surface are selected.

In an especially advantageous embodiment of the invention there is provision for a further reverse pulse plating to be undertaken after the creation of the nanostructure such that the nanostructure elements are oxidized. The reverse pulse plating for oxidization of the nanostructure elements can preferably be undertaken with the following method parameters: The said pulse sequence for the growth of the layer with cathodic and anodic pulse is supplemented by a third potential-controlled pulse which promotes the oxidization process of the nanostructure elements. The disadvantage of the oxidization process of the nanostructure elements is that the nanostructure elements consist of projections with preferably needle-shaped structure of which the tips are more strongly subjected to an electrochemical attack than the areas around the nanostructure elements. Thus an oxidization reaction will preferably occur at the nanostructure elements.

In a further method step non-oxidized parts of the coating can then be electrochemically dissolved to expose the metal. This is possible for example by applying a direct current potential to the coating since the oxidized nanostructure elements have a higher standard potential than the oxidized parts of the coating. If the coating has for example been created from copper this copper will dissolve more quickly than the nanostructure elements made of copper oxide. As soon as a layer of silver is exposed under the coating for example this also exhibits a higher standard potential than copper so that this largely remains intact. This advantageously enables the exposure of the silver to be controlled with the electrochemical process executing in this case running stably. A post-processing of the surface with the lower wettability and simultaneous anti-microbial characteristics is not necessary.

Instead of an electrochemical dissolution of non-oxidized parts of the coating the coating can alternatively also be applied for example using a mask which covers parts of the layer of anti-microbial metal lying under the coating. This mask which can for example consist of photo resist can be dissolved by means of a suitable solvent as soon as the layer has been completed. In this way a part of the layer made of anti-microbial material can be exposed again in order to create an inventive anti-microbial surface which simultaneously reduces wettability.

BRIEF DESCRIPTION OF THE DRAWINGS

Further details of the invention are described below with reference to the drawing. In the individual figures the same or corresponding elements of the drawing are provided with the same reference symbols in each case, with these only being explained more than once when there are differences between the figures. The figures show FIG. 1 the schematic structure of an exemplary embodiment of the inventive surface in a schematic cross section, FIG. 2 the surface profile of a lotus-effect surface with anti-microbial characteristics as an exemplary embodiment of the inventive surface in cross section and FIGS. 3 and 4 perspective diagrams of the lotus-effect surface with anti-microbial characteristics as depicted in FIG. 2.

DETAILED DESCRIPTION OF INVENTION

Figure 1:
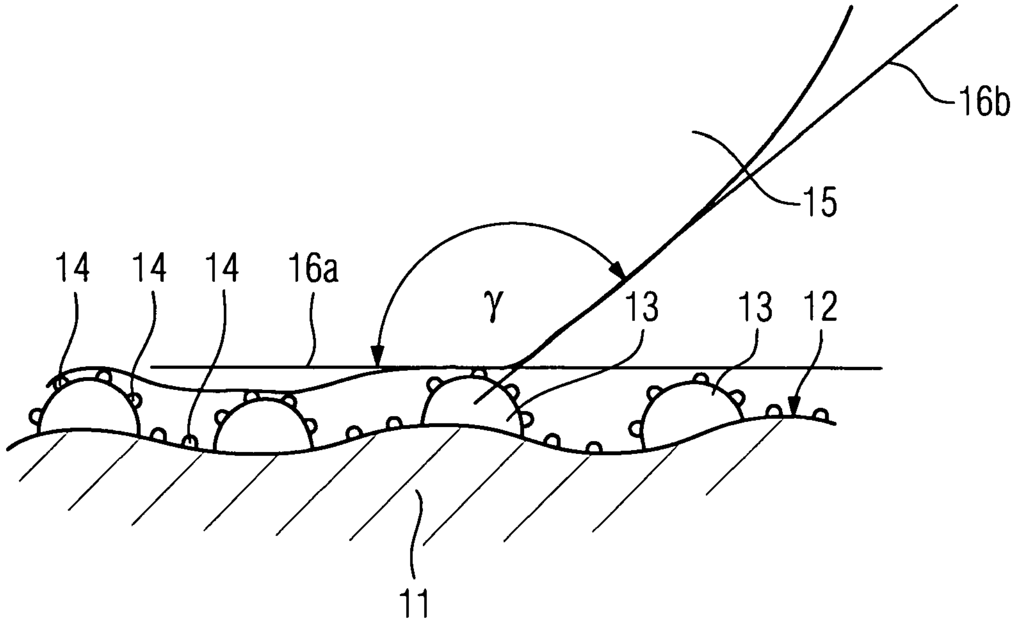

FIG. 1 shows a component 11 with a surface or which the wettability is reduced. The surface 12 can be schematically described by an overlaying of a macrostructure 12 (which can for example be specified by the geometry of the component) with a microstructure 13 and a nanostructure 14. The microstructure creates a waviness of the surface. The microstructure is indicated by hemispherical projections on the wavy microstructure 12. The nanostructure 14 is illustrated in FIG. 1 by naps which are located on the hemispherical projections (microstructure) as well as partly in the parts of the microstructure 12 located between the projections which form the indentations of the microstructure 13.

The adhesion-reducing characteristics of the surface formed by the overlaying of the macrostructure 12, the microstructure 13 and the nanostructure 14 become clear in relation to a water droplet 15 which forms a water pearl on the surface. The low wettability of the surface on the one hand and the surface tension of the water droplet on the other hand mean that a relatively large contact angle γ is formed between the water droplet 15 and the surface which is defined by an angle limb 16*a*, and an angle limb 16*b* forming a tangent on the skin of the water droplet which runs through the edge of the contact surface of the water droplet 15 with the surface (or more precisely with the angle limb 16*b*). A contact angle γ of more than 140° is shown in FIG. 1, so that the surface shown schematically is what is known as a super hydrophobic surface.

The component 11 in accordance with FIG. 1 consists of silver, with the microstructure 12 forming a part of the overall surface of the component 11. This part of the surface is characterized in that the silver can come into direct contact with the environment, in which case the anti-microbial characteristics of the silver are brought to bear. The effect of this for example is that microorganisms which cause a reduction in the contact angle γ would not be able to hold onto the surface which means that the low wettability of the surface can be maintained even over a longer period of use of the component 11.

Within the framework of trials a lotus effect surface can be created by deposition of copper on a surface smoothed by electropolishing made of silver by means of reverse pulse plating. In this case the following method parameters can be selected.

1. Creating the coating with the microstructure and the nanostructure in one the method step by reverse pulse plating:
Pulse length (reverse pulse): 240 ms at 10 A/dm$^2$ cathodic, 40 ms at 8 A/dm$^2$ anodic
Electrolyte contains 50 g/l Cu, 20 g/l free cyanide, 5 g/l KOH (alternatively the following composition: 72 g/l CuCN, 125 g/l KCN, 5 g/l KOH)

2. Oxidation of the predominantly nanostructure elements in a subsequent method step:
Pulse length (extended reverse pulse): 240 ms at 10 A/dm$^2$ cathodic, 40 ms at 8 A/dm$^2$ anodic and 50 to 100 ms potential-controlled with u=+1.2V anodic.
Electrolyte as in Step 1

3. Dissolving the coating in the non-oxidized areas and exposing the silver with the following parameters: The pulse is a unipolar-potential-controlled pulse in the anodic direction: I(cath.)=0 A/dm$^2$; u(anod.)=+0.5V; t(cath.)=200-2501 ms; t(anod.)=50-1001 ms.

The electrochemically-created surface can be investigated below by means of an SPM (Scanning Probe Microscope—also called an AFM or Atomic Force Microscope). An SPM allows the surface structures to be determined and displayed down to the nanometer range. A section of the surface able to be created by the above trial parameters is shown schematically in cross section in FIG. 2, with the height of the profile being accentuated (schematic diagram in accordance with the template of SPM investigations).

Figure 2:
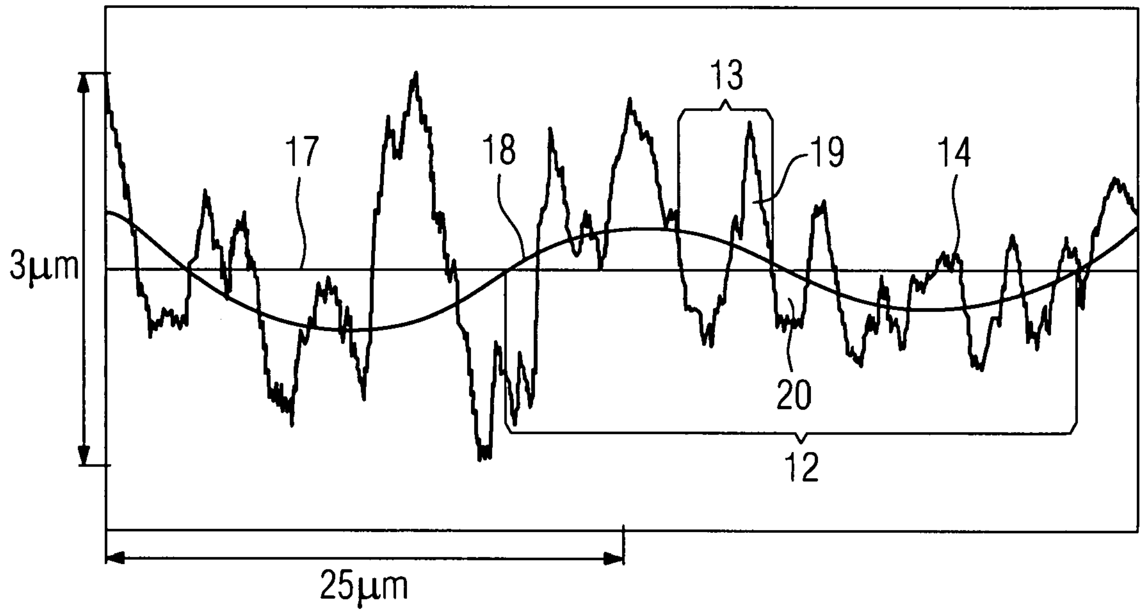

In relation to a zero line 17 an wavy curve 18 is entered in FIG. 2 which illustrates the macrostructure which is overlaid onto the surface structure. The microstructure 13 is shown as a result of the accentuation as a series of needle-type projections 19 and recesses 20. Furthermore in particular areas the nanostructure 14 has been indicated which is produced from a tight sequence of projections and recesses which in the scale used in accordance with FIG. 2 would no longer be able to be resolved and can thus be only recognized as a thickening of the profile line of the surface profile.

Figure 3:
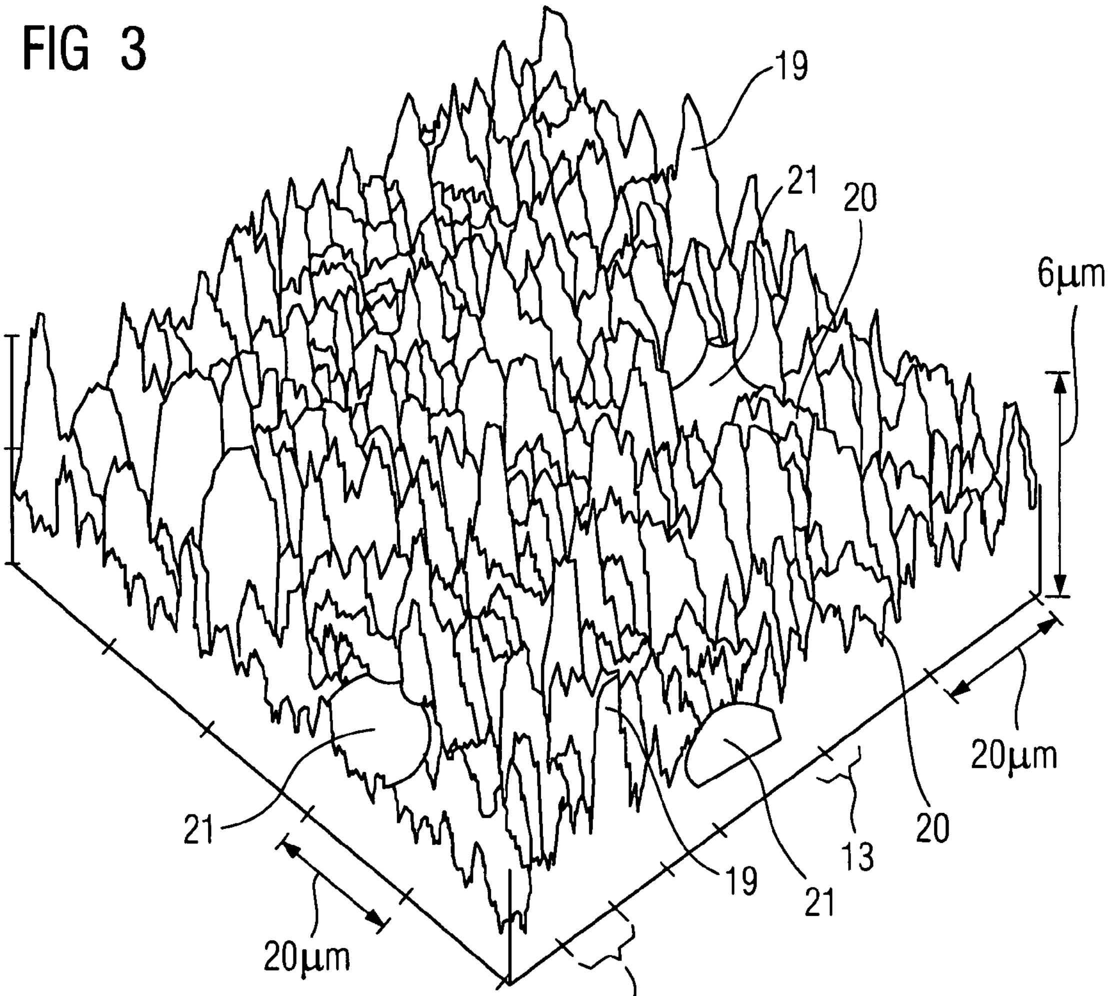

More details can be taken from FIG. 3 which shows a perspective view of the copper surface. A square area of 100×100 μm has been selected as a cross section with the needle-type projections 19 defining the microstructure 13 being clearly recognizable. The image produced reminds the viewer of a “coniferous forest” where the spaces between the “conifers” (projections 19) are formed by the recesses 20. The surface depicted in FIG. 3 is also represented exaggerated to clearly show the projections 19 and the recesses 20 of the microstructure 13.

As can also be seen from FIG. 3, the coating which consists of the projections 19 and the recesses 20 does not cover the entire surface of the substrate, i.e. in a few places the silver as surface of the component 11 is exposed. These areas 21 are to be recognized in FIG. 3 by more or less “smooth” regions which form “clearings” in the “coniferous forest”. In these areas 21 the surface of the component formed by the silver can develop the typical anti-microbial characteristics of silver.

Figure 4:
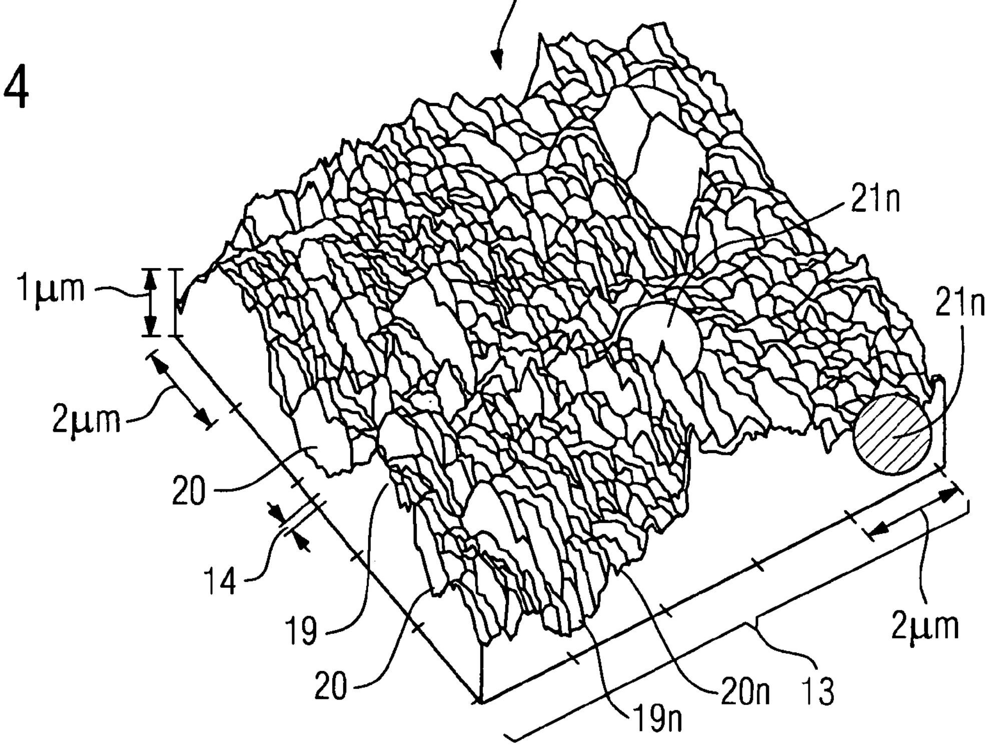

As is evident from the perspective view of the surface depicted in FIG. 4 which represents a sectional enlargement of the diagram depicted in FIG. 3, the microstructure 13 is further overlaid by a nanostructure 14. In the diagram in FIG. 4 in which the height is less exaggerated, the projections 19 and recesses 20 appear more like a waviness of the surface (which however because of the different scale should not be confused with the waviness depicted in FIG. 2). Overlaid on this waviness are also the very smallest projections 19*n* and recesses 20*n* which characterize the nanostructure of the surface. These too are reminiscent in their structure of the characteristic of a “coniferous forest” already explained in connection with FIG. 3, with their geometric dimensions being approximately twice as small so that, with the scale selected in FIG. 3, they cannot be seen at all.

To clarify the size relationships, the macrostructure 12, the microstructure 13 and the nanostructure 14 are each identified by bracketed areas in FIGS. 2 and 3. The bracketed area in each case only features a section of the respective structure which contains one projection and one recess so that the brackets in relation to each other within a figure in each case allow a comparison of the sizes of the structures in relation to each other. With the exemplary embodiment shown this can be achieved for a water droplet contact angle of 150° and greater. The superhydrophobic characteristics of the copper layer shown, which bring about a lotus effect, are achieved by an interaction between at least the microstructure 13 and the nanostructure 14, with the overlaying of a microstructure being able to further improve the observed effects. By selecting suitable process parameters these types of lotus-effect surfaces can be created for different layer materials and for liquids with different wetting behavior.

The invention claimed is:

1. A component, comprising:

a substrate having a surface;

a metallic anti-microbial intermediate layer arranged on and in contact with the substrate surface; and a metallic coating arranged on the intermediate layer by reverse pulse plating thereby creating a coating nanostructure overlain a coating microstructure, and a surface of the component with a coating has a lower wettability than the substrate surface without the coating; and, wherein the nanostructure is oxidized and the coating has non-oxidized areas which are dissolved to expose portions of the metallic anti-microbial intermediate layer.

2. The component as claimed in claim 1, wherein the metallic anti-microbial intermediate layer is formed of silver.

3. The component as claimed in claim 1, wherein the metallic coating consists of a biaxial textured epitactic layer.

4. The component as claimed in claim 3, wherein the metallic coating comprises copper, and foams a biaxial textured, epitactic layer.

5. The component as claimed in claim 4, wherein an outward facing surface of the coating has a microstructure which promotes the lotus effect.

6. The component as claimed in claim 5, wherein structure elements of the nanostructure consist of a metal oxide.

* * * * *